United States Patent [19]

Hilligoss et al.

[11] Patent Number: 4,991,195

[45] Date of Patent: Feb. 5, 1991

[54] APPARATUS AND METHOD FOR TESTING A TELEPHONE CIRCUIT PROTECTOR

[75] Inventors: Lawrence O. Hilligoss, Ashland, Oreg.; Myron C. Butler, Edmond, Okla.

[73] Assignee: Communications Manufacturing Company, Los Angeles, Calif.

[21] Appl. No.: 494,961

[22] Filed: Mar. 16, 1990

[51] Int. Cl.⁵ .............................................. H04M 3/26
[52] U.S. Cl. .......................................... 379/1; 379/9; 379/21
[58] Field of Search ...................... 379/9, 1, 21, 26, 10, 379/186, 322, 323, 412

[56] References Cited

U.S. PATENT DOCUMENTS 4,912,755  3/1990  Blood et al. ...................... 379/21 X Primary Examiner—Stafford D. Schreyer
Attorney, Agent, or Firm—Laney, Dougherty, Hessin & Beavers

[57] ABSTRACT

An apparatus and method for testing voltage arresters and current shunting circuits within a telephone circuit protector are described. A typical protector tested by the apparatus and method includes two voltage arresters and two current limiting circuits. One set of a voltage arrester and a current limiting circuit are tested for voltage breakdown, continuity and ground faults by actuation of a single test operating switch. The other voltage arrester and current limiting circuit are then selected and tested by a single actuation of the test operating switch. Breakdown voltage, continuity, ground fault and low battery visual indicators are provided.

12 Claims, 4 Drawing Sheets

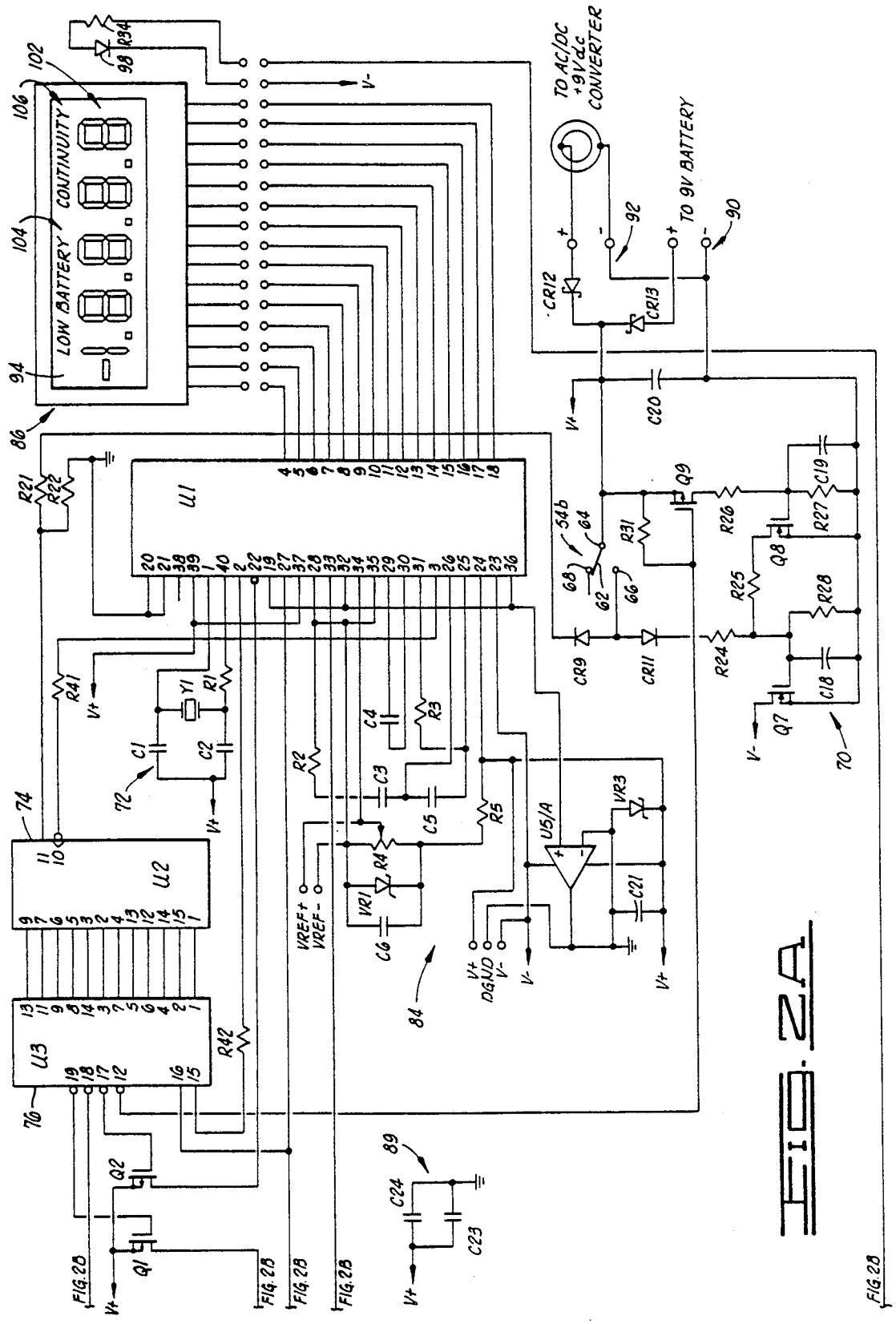

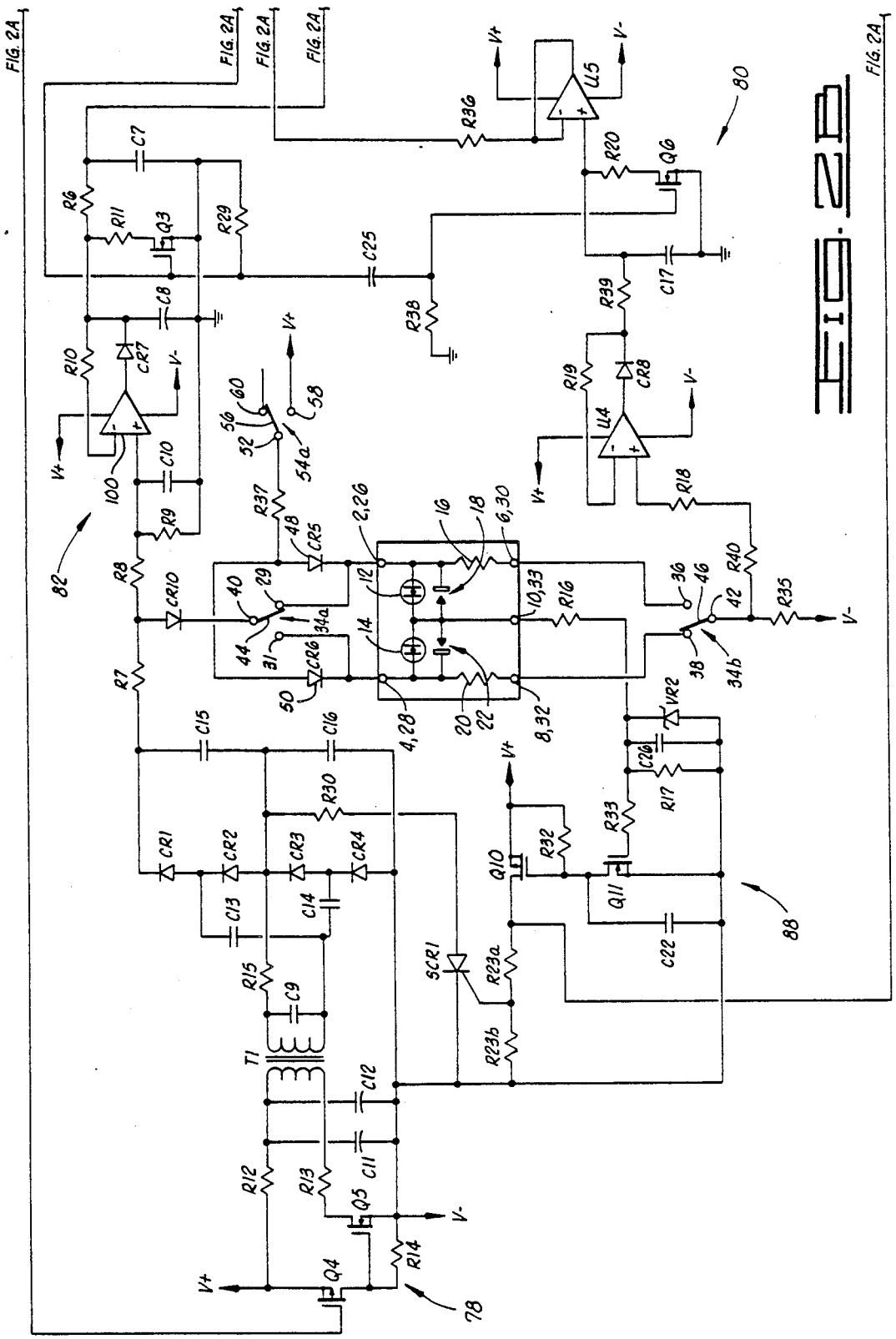

APPARATUS AND METHOD FOR TESTING A TELEPHONE CIRCUIT PROTECTOR

BACKGROUND OF THE INVENTION

This invention relates to apparatus and methods for testing a telephone circuit protector, such as a five-pin central office protector.

A telephone central office's primary line of defense from outside high voltages (e.g., lightning) includes voltage arresters found in central office protectors. Such protectors can also include current shunts to protect against hazardous currents. These protectors are typically located on a frame interface to an outside plant transmission facility.

A principal function of a protector is to safeguard operating personnel and connected equipment from hazardous longitudinal potentials and currents. The hazardous voltages are discharged to ground via the voltage arresters, and the hazardous currents are grounded out after heating or otherwise closing the shunts to ground.

One type of protector includes air-gapped carbon arresters. Such an arrester includes two ceramic mounted blocks of carbon separated by an air gap. The gap distance is directly proportional to the voltage necessary to arc across (breakdown) the gap. Carbon arresters with nominal 3-mil gaps (450 volt) are characterized by large statistical variations in breakdown voltages and life expectancies in the 100's. Representative $\pm 3\sigma$ breakdown voltage ranges are 300 to 700 volts on surges with 2000 V/sec (DC breakdown) and 360 to 950 volts on surges with 100 V/usec (fast impulse breakdown) rate-of-rise. Two standard breakdown voltages are 350 V and 450 V.

Another type of protector includes gas tube arresters. Unlike air-gapped carbon arresters, the performance characteristics of gas tube arresters can be relatively tightly controlled. This is due to the gas tube's sealed environment, metal/ceramic construction, and wider gap filled with ionizing gas. Gas tubes with a nominal DC breakdown voltage rating of 450 volts typically have a smaller statistical variation in their breakdown voltages. Representative $\pm 3\sigma$ breakdown voltage ranges are 400 to 500 volts.

Another type of protector, which is gaining in popularity, is the solid-state protector. This type typically has even smaller or tighter tolerances regarding variation in breakdown voltage.

In addition to having voltage arresters, each of these types of protectors can include a circuit through which potentially damaging currents, at least some of which are referred to as sneak currents, can be shunted to ground. One type of current limiting circuit includes a heat coil which heats an associated temperature-responsive shunt element. When a sufficient temperature is reached, the shunt closes to conduct the current to ground.

For these protectors to protect, their voltage and current limiting circuits must function properly. Thus, there is the need for an apparatus and method for nondestructively testing the protectors. Although there are devices which test at least some aspects of these types of protectors, we are not aware of a test apparatus or method which tests a voltage limiting circuit and a current limiting circuit for the breakdown voltage of the voltage limiting circuit, for continuity of the current limiting circuit, and for ground faults, during a single test period and which also visually displays the breakdown voltage and continuity and ground fault indications. There is a need for such an apparatus and method so that these types of protectors can be more completely and efficiently tested.

SUMMARY OF THE INVENTION

The present invention meets the aforementioned need by providing a test apparatus and method through which the voltage limiting and current limiting circuits of a central office protector can be tested, and respective visual displays provided, for breakdown voltage, continuity and ground faults.

The telephone circuit protector test apparatus of the present invention, which protector includes a voltage limiting circuit and a current limiting circuit, comprises: means for providing a changing voltage to the voltage limiting circuit; means for detecting a magnitude of the voltage provided prior to the voltage limiting circuit operating to limit voltage; means for providing a current to the current limiting circuit; means for detecting current conducted through the current limiting circuit to a telephone circuit terminal of the protector; and display means for visually displaying a value of the detected magnitude of the voltage and for visually indicating a response to the means for detecting current. This apparatus further comprises: grounding detector means for detecting a short-circuit through the voltage limiting circuit to a ground terminal of the protector and for detecting current conducted through the current limiting circuit to the ground terminal of the protector, the grounding detector means including: means for preventing the means for providing a changing voltage from providing the voltage to the voltage limiting circuit in response to a short-circuit through the voltage limiting circuit or in response to a current conducted through the current limiting circuit to the ground terminal; and means for activating the display means in response to a short-circuit through the voltage limiting circuit or in response to current conducted through the current limiting circuit to the ground terminal.

In a particular embodiment, the present invention provides a telephone circuit protector test apparatus, which protector includes: two tip line terminals; two ring line terminals; a ground terminal; a first voltage arrester, connected to one of the tip line terminals and the ground terminal; a second voltage arrester, connected to one of the ring line terminals and the ground terminal; a first heat coil, connected to the tip line terminals; a second heat coil, connected to the ring line terminals; a first current shunt, connected to one of the tip line terminals and the ground terminal; and a second current shunt, connected to one of the ring line terminals and the ground terminal; the apparatus comprising: a housing; a first switch mounted on the housing; a second switch mounted on the housing; an alphanumeric display mounted on the housing; a light-emitting diode mounted on the housing; connector means, mounted on the housing and connected to the first and second switches, for connecting the apparatus with the terminals of the protector: a first integrated circuit disposed in the housing and connected to the display, the first integrated circuit including an analog-to-digital converter and display drivers; an oscillator disposed in the housing and connected to the first integrated circuit; a second integrated circuit, disposed in the housing and connected to the first integrated circuit, the second integrated circuit including a counter; a third integrated circuit, disposed in the housing and connected to the second integrated circuit, the third integrated circuit including a programmable array logic means for providing four control signals in response to counts from the counter; a high voltage generator circuit disposed in the housing and connected to the second switch and to the third integrated circuit so that the high voltage generator circuit is responsive to one of the control signals; a breakdown voltage peak detector circuit disposed in the housing and connected to the high voltage generator circuit, to the first integrated circuit, and to the third integrated circuit so that the breakdown voltage peak detector is responsive to another of the control signals; a continuity detector circuit disposed in the housing and connected to the second switch and to the first and third integrated circuits, wherein the continuity detector circuit is responsive to the another of the control signals; a ground fault detector circuit disposed in the housing and connected to the connector means, to the high voltage generator circuit, and to the light-emitting diode so that the light-emitting diode is responsive to the ground fault detector circuit; and an on/off control circuit disposed in the housing and connected to the first switch, to the second integrated circuit, and to the third integrated circuit so that the on/off control circuit automatically turns the apparatus off in response to a further one of the control signals.

The present invention also provides a method of testing a telephone circuit protector as just described. The method comprises: selecting either the first voltage arrester and the second heat coil and current shunt or the second voltage arrester and the first heat coil and current shunt for testing; and operating a single switch through a single switch closure and switch opening cycle for testing the selected voltage arrester and heat coil for breakdown voltage and continuity, respectively, and indicating a result of the testing, including: upon the single closure of the single switch, conducting a current through the protector and detecting whether the current is conducted through the selected heat coil to its respective line terminal or through the selected voltage arrester or current shunt to the ground terminal; illuminating a continuity indicator and enabling the testing of the selected voltage arrester in response to detecting the current being conducted through the selected heat coil; illuminating a ground fault indicator and disabling the testing of the selected voltage arrester in response to detecting the current being conducted through the ground terminal; generating and applying a high voltage to the selected voltage arrester in response to detecting the current being conducted through the selected heat coil; and detecting and displaying the magnitude of the maximum voltage before the selected voltage arrester breaks down in response to the generated and applied high voltage. In a preferred embodiment the step of operating a single switch energizes an electrical circuit to which the protector is connected and then automatically deenergizes the electrical circuit during the single switch operating cycle after the testing and indicating are performed.

Therefore, from the foregoing, it is a general object of the present invention to provide a novel and improved apparatus and method for testing a telephone circuit protector. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIGS. 2A and 2B are a schematic circuit diagram of a particular implementation of the functional block diagram shown in FIG. 1.

DETAILED DESCRIPTION OF THE PREFERRED EMBODIMENT

Figure 1:
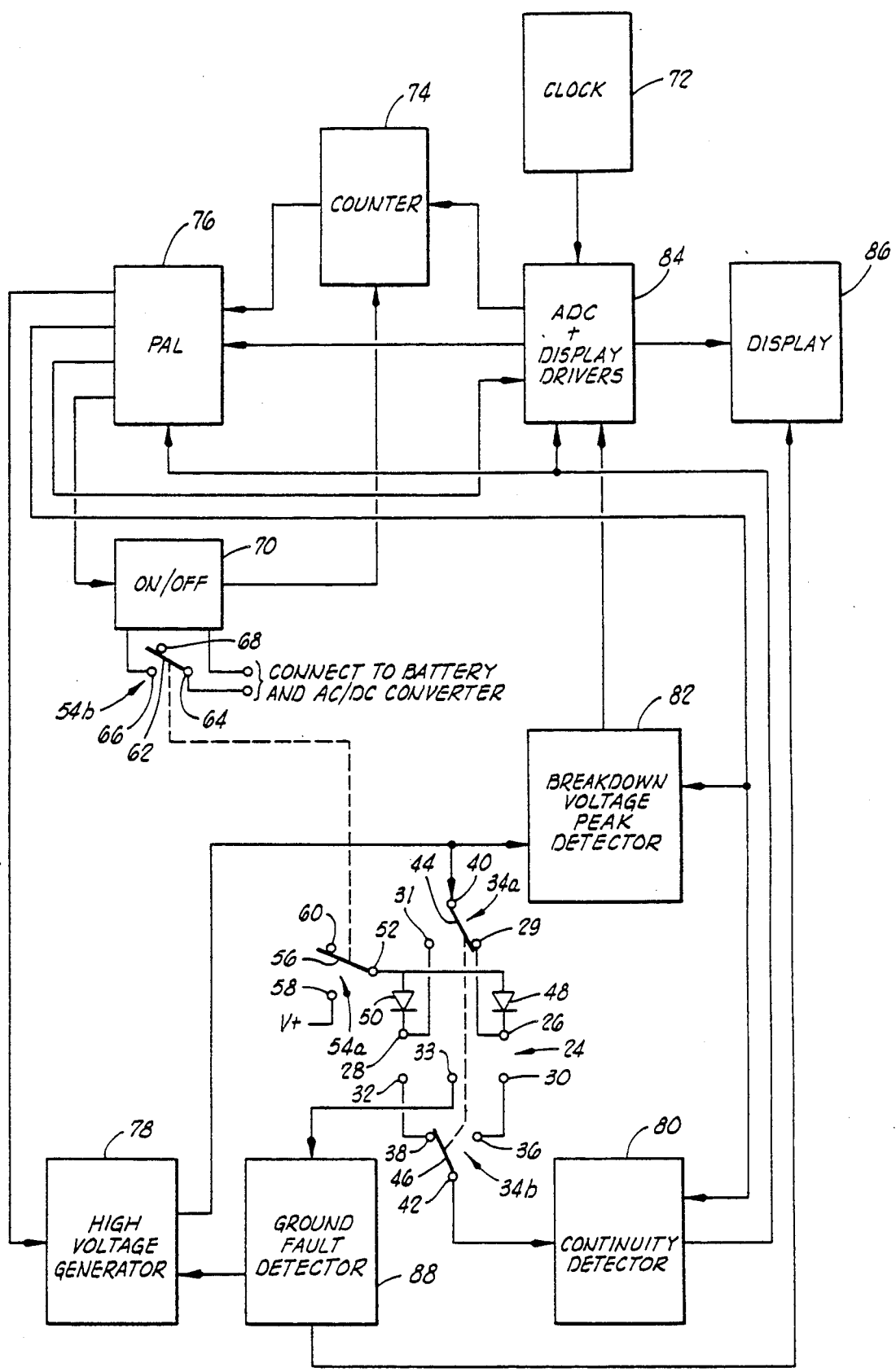
FIG. 1 is a functional block diagram of the preferred embodiment apparatus of the present invention.

The preferred embodiment of the present invention will be described with reference to testing a five-pin, voltage arrester/current shunt type protector; however, adapters can be used to accommodate a variety of protectors other than this five-pin type. It is also contemplated that the present invention can be modified to directly accommodate other types of protectors.

The five-pin protector with respect to which the preferred embodiment will be described is schematically illustrated in FIG. 2B. The pins or terminals of the protector include a field-side tip terminal 2, a field-side ring terminal 4, a central office (CO)-side tip terminal 6, a CO-side ring terminal 8 and a ground terminal 10. The protector also includes a voltage arrester 12 connected to the field-side tip terminal 2 and the ground terminal 10, and the protector also includes a voltage arrester 14 connected to the field-side ring terminal 4 and the ground terminal 10. These provide voltage limiting circuits within the protector. Current limiting circuits are also provided. One of the current limiting circuits includes: a heat coil 16 connected in series to the tip terminals 2, 6, and a temperature-responsive mechanical shunt 18 connected to the terminals 2, 10. The other current limiting circuit includes: a heat coil 20 connected in series to the ring terminals 4, 8, and a temperature-responsive mechanical shunt 22 connected to the terminals 4, 10. These elements are of conventional types such as found in Western Electric Company/AT&T types of protectors.

The present invention includes connector means for connecting the apparatus of the present invention with the terminals 2, 4, 6, 8, 10 of the protector. Such a connector means includes a socket 24 schematically illustrated in FIG. 1. The socket 24 includes terminals 26, 28, 30, 32, 33 for receiving the pins or terminals 2, 4, 6, 8, 10 respectively, of the protector (note FIG. 2B). As shown in FIG. 1, the terminals 26, 28 are connected to terminals 29, 31, respectively, of a section 34a of a double pole, double throw switch 34. The switch 34 also has a section 34b which includes terminals 36, 38 connected to socket terminals 30, 32, respectively. The switch 34 includes poles 40, 42 to which are connected switchable ganged contact members 44, 46, respectively. The switch 34 is configured so that when the contact member 44 connects to the tip side (via terminal 29), the contact member 46 contacts the ring side (via terminal 38), and vice versa. The reason for this and the further operation of the switch 34 will be further described hereinbelow.

The socket terminals 26, 28 are also connected, through respective diodes 48, 50, to a pole 52 of section 54a of a double pole, single throw (spring return) switch 54. Connected to the pole 52 is a switchable contact member 56. The member 56 is moved against a terminal 58 in response to manual operation of the switch 54, and it is biased to return against an open circuit terminal 60 when the actuating force is released from the switch 54, thereby defining a single closure and opening operating cycle of the switch 54.

The contact member 56 is ganged to another contact member 62, which is part of section 54b of the switch 54. The member 62 is connected to a pole 64. During the single operation cycle of the switch 54, the contact member 62 moves against a terminal 66 upon actuation of the switch 54, and it automatically returns against an open circuit terminal 68 when the switch actuating force is released. The switch section 54b including elements 62, 64, 66, 68 is connected to an on/off power control circuit 70 of the preferred embodiment of the present invention.

FIG. 1 also shows that the preferred embodiment of the present invention includes clock 72 for providing clocking signals to a counter 74. The counter 74 responds to the clock 72 by providing counts of the clocking signals. The count outputs from the counter 74 are provided to a means 76 specifically implemented by a programmable array logic device, for providing programmed outputs in response to the counts. The means 74 and 76 are included within what is referred to as an event sequencer of the preferred embodiment. One of the programmed outputs of the means 76 activates a means 78 for providing a changing voltage to the voltage limiting circuit of a connected protector. The means 78 is identified in FIG. 1 as a high voltage generator. Another of the programmed outputs from the means 76 resets a means 80 for detecting current conducted through the current limiting circuit of the protector to one of the telephone circuit terminals (tip or ring) of the protector. This is identified in FIG. 1 as a continuity detector. The resetting output from the means 76 also resets means 82 for detecting a magnitude (the maximum in the preferred embodiment) of the voltage provided prior to the voltage limiting circuit of the protector operating to limit voltage. This is identified in FIG. 1 as a breakdown voltage peak detector. Another one of the programmed outputs from the means 76 causes a value for the detected breakdown voltage magnitude to be retained in an analog-to-digital converter and display driver circuit 84. Both the means 76 and 84 are responsive to the continuity detector 80. The retained voltage magnitude value is provided to a display 86 for visually displaying the detected voltage magnitude. Display 86 of the preferred embodiment also provides for visually indicating a response to the continuity detector 80 and for visually indicating a response to a ground fault detector 88. The ground fault detector 88 detects a short-circuit through the voltage limiting circuit of the protector to the ground terminal of the protector, and it detects current conducted through the current limiting circuit of the protector to the ground terminal. The ground fault detector 88 includes means for preventing the high voltage generator 78 from providing the voltage to the voltage limiting circuit of the protector in response to a short-circuit through the voltage limiting circuit or in response to current conducted through the current limiting circuit to the ground terminal. The ground fault detector 88 also includes means for activating the display 86 in response to a short-circuit through the voltage limiting circuit or in response to current conducted through the current limiting circuit to the ground terminal. A further one of the programmed outputs from the means 76 deactivates the apparatus through the on/off circuit 70. These elements will be more particularly described with reference to FIGS. 2A-2B.

On/Off Circuit 70 (FIG. 2A).

The particular implementation of the preferred embodiment apparatus of the present invention shown in FIGS. 2A-2B is designed to operate from a 9-volt power source connected to connector 90 (9 volt transistor battery) or connector 92 (AC/DC 9-Volt converter). The positive terminals of the connector 90, 92 are connected to the system positive supply V+ via the Schottky low forward voltage drop diodes CR12 and CR13. These two diodes prevent any harmful interaction between the battery and AC/DC converter. The power source is turned "ON" and "OFF" by electronically connecting and disconnecting the negative supply V- obtained from the negative voltage source terminals of the connectors 90, 92. This electronic connection is made with Q7, an IR511 N-channel MOSFET, which has an "ON" resistance of 0.6 ohms.

The apparatus turns "ON" when the capacitor C18 is charged above the transistor Q7's gate-source voltage threshold of 2.5 Vdc. The charging of C18 (4.7 uf) is started when the momentary push-button switch 54 is pressed. This moves the contact member 62 against the terminal 66 which connects V+ to CR11 to source current through resistor R24 (100 ohm) to the capacitor C18.

The apparatus is turned "OFF" when the capacitor C18 is discharged. This is accomplished by transistor Q8, a 2N7000 N-channel MOSFET, being biased "ON" via transistor Q9. When "ON", Q8 discharges C18 which turns Q7 off, thereby disconnecting the negative power source terminal from V-. The P-channel MOSFET Q9 is controlled by an output from the event sequencer (specifically, one of the outputs from the PAL 76). When this sequencer output goes low (5 vdc below V+), Q9 turns "ON" and sources current through R26 and R27 (both 10 K ohm). The voltage developed at the gate of Q9 will be half V+ and maintained by the capacitive reservoir C19 (2.2 uf) until the system is completely turned "OFF". The resistor R28 (100 ohm) limits the surge current when Q8 is discharging C18.

Since the positive supply V+ is always connected to the power source, there is a very small current path to C18 via CR9, CR11, and R24. To prevent the capacitor C18 from slowly charging up and inadvertently turning the system "ON", the resistor R28 acts as a high resistance (20 Mohm) current bleeder to insure that the system will stay turned "OFF".

The system voltage regulation is controlled by the single chip A/D converter ICL7129A, U1. The voltage between V+ and the pin DGND (U1pin 36) is +5 Vdc and is the internal supply voltage for the logic section of U1. Since U1 pin 36 (DGND) can only sink a small amount of current, the buffer U5/A enables the external logic circuits ground to be referenced to the same voltage as U1's DGND.

A low battery voltage determination is made within U1 by an internal 6.3 V Zener diode and the threshold voltage of an internal N-channel transistor connected to the V- supply. A "LOW BATTERY" indicator of the display means 86 turns on when the supply voltage between V+ and V- as monitored within U1 drops below 7.2 vdc in the illustrated embodiment.

Clock 72 (FIG. 2A)

The system clock signal of the illustrated implementation is generated through U1 in response to a 100 K Hz crystal oscillator including crystal Y1 and capacitors C1, C2. The oscillator's output is connected through U1 to the PAL 76 (via R42, 1 K ohm) and is also internally divided by two to generate U1's reference clock. The ICL7129 A (U1) also divides the oscillator frequency by 1200 to generate the backplane frequency of 83.3 Hz used by a liquid crystal display (LCD) 94 implementing the display 86. This divided frequency is available at pin U1-3 and is CMOS logic compatible since the pin VDISP (U1-19) is referenced to DGND.

Event Sequencer (Counter 74, PAL 76) (FIG. 2A)

The 83.3 Hz clock from U1-3 drives (via a 1 K ohm buffer resistor R41) the clock input on the CD4040 integrated circuit 12-bit counter (U2) implementing the counter 74. The counter's 12 outputs are connected to the integrated circuit PAL 76 (U3). The event sequencer includes these integrated circuits U2 and U3. The test sequence is reset during the pressing of the momentary push-button 54, connected to U2 via CR9, R21 (1 K ohm) and R22(5.1 K ohm). Register R21 acts as a protection resistor, and resistor R22 acts as a pull-down resistor when the push-button is released.

The counter U2 increments from 0 to 4095 in 24 millisecond intervals. The PAL U3 is programmed to activate one of it's four outputs at different counts, sequencing the test apparatus through its testing of a connected protector. In conjunction with the counter outputs, the PAL also has inputs from two other sources: the 100 Hz clock (via 1 K ohm buffer resistor R42) from U1 and the continuity signal via (1 K ohm buffer resistor R36) from the continuity detector 80.

The following are the pin definitions and output Boolean equations needed to implement U3 in a TIC-PAL16L8-55 JC or N CMOS PAL.

| Pin Definitions | |
|---|---|
| 01: C12 | 20: VCC |
| 02: C11 | 19: /DISCHARGE |
| 03: C6 | 18: /HVDRIVE |
| 04: C10 | 17: /HOLD |
| 05: C8 | 16: CONTIN |
| 06: C9 | 15: 100KHZ |
| 07: C7 | 14: C5 |
| 08: C4 | 13: C1 |
| 09: C3 | 12: /PWROFF |
| 10: GND | 11: C2 | where:
C1 to C12 are PAL inputs connected to the 12 bit counter U2. C1 is the LSB of the counter (period = 24 msec) and C12 is the MSB of the counter (period = 98 seconds).
CONTIN is a PAL input connected to the "Continuity" detect circuit output. This signal is TRUE when high.
100KHZ is a PAL input connected to the buffered ICL7129A oscillator's output. It will be gated inside the PAL during a sequence for a minimum length of time.

Boolean Equations

Equation for 1st phase of sequence (384 msec) let:

phase 1 = /C12*/C11*/C10*/C9*/C8*/C7*/C6 then the output equations: (4 total)

| | |
|---|---|
| /DISCHARGE | :OE= force-hi |
| | :/C= phase_1 * / C5 * / C4 * / C3 |
| /HVDRIVE | :OE= force-hi |
| | :/C= phase_1 * C5 * C4 * C3 * C2 * C1 * 100KHZ * CONTIN |
| /HOLD | :OE= force-hi |
| | :/C= C12 + C11 + C10 + C9 + C8 |
| /PWROFF | :OE= force-hi |
| | :/C= C12 * C11 * C10 * C9 * C8 * C7 * C6 * C5 * / C4 | where output:
/DISCHARGE—goes low during the interval from count0, "RESET", to count =8 (192 msec). This line controls discharge transistors Q3 and Q6 of the breakdown voltage detector 82 and the continuity detector 80, respectively (FIG. 2B). When active (LOW), this line zeros the detectors' hold capacitors C8 and C17.

/HVDRIVE—if "Continuity" is detected (HIGH) and the matching count is present on the PAL'S inputs, the 100 K Hz clock is gated onto this pin. This output drives the high voltage generator 78.

/HOLD—after the high voltage signal is applied to the protector by the generator 78 and the peak detector 82 is holding the highest breakdown voltage, U1 takes a reading. This /HOLD line controls the value displayed out of U1. When /HOLD finally is active (LOW), the LCD display holds its last value. /HOLD is active until the push button 54 is pressed (RESET) or until the unit powers down.

/PWROFF—this output controls transistor Q9 in the power control circuit 70. When active (LOW), the holding voltage at the gate of Q7 is removed, turning the unit "OFF". This U3 line will go low (and turn the unit "OFF") after 50 seconds from the last RESET.

Shown in FIG. 2A is a circuit 89 which is connected to U3 to provide decoupling.

High Voltage Generator 78 (FIG. 2B)

The high voltage generator circuit 78 includes a high current drive transistor Q5 connected to a step-up transformer T1 which in turn drives a full-wave voltage quadrupler comprising resistor R15, capacitors C13, 14, 15, 16, and diodes CR1, 2, 3, 4. The sequencer output, /HVDRIVE, provides a gated 100 K Hz switching signal to drive this circuit. This signal is level shifted by the P-channel MOSFET Q4 and resistor R14 (1 K ohm) to provide a maximum voltage drive for transistor Q5.

Transistor Q5 is an N-channel power MOSFET (IR511) which creates a high current path to V- on the primary side of the transformer T1. When Q5 is "ON", a large current (<3.5 A) passes from the capacitive reservoir (C11+C12=2000 uf) through the primary winding, and then through the current limiting resistor R13 (2.4 ohm). When Q5 is turned "OFF" quickly, the voltage at the junction of R13 and T1 kicks back and rises to 2 V+. The transformer core material and the number of turns of the secondary winding create an inductance of approximately 24 mH. This inductance, in parallel with the total capacitance on the output of T1, was selected to be resonant in this circuit at a frequency of 100 K Hz. The magnetic field generated by the 3½ turn primary winding is coupled to the secondary windings (616 turns) generating a stepped-up 100 K Hz sine wave. The transformer's secondary winding output drives the full-wave voltage quadrupler. The 100 K Hz resonance of the circuit is adjusted via the T1 adjuster. The value of C9 was selected so the 100 K Hz resonance point is achieved when the adjuster is approximately 50% screwed into T1.

If a transformer adjuster is used, C9 is 43 pf; if an adjuster is not used, C9 is 51 pf. The total capacitance on the output of T1 is C9+T1 winding capacitance+printed circuit board capacitance.

The voltage quadrupler operates in the following way. If we assume that the transformer's secondary winding's output voltage is in its positive half-cycle with a peak value of Vs, then C13 (0.01 uf) will charge through CR2 to Vs. Also, C16 (0.01 uf) and C14 (0.01 uf) in series with CR4 charge to Vs/2 (since C16=C14). During the negative half-cycle C13 (still charged to Vs) in series with the transformer voltage charges C15 (0.01 uf) through CR1 to 2 Vs. Also, C14 charges to Vs through CR3 with the opposite polarity than before. On the next positive half-cycle, capacitor C16 is charged to 2 Vs since the voltage across C14 and the transformer voltage are in series. In addition, the charge on C13 is replenished. At this point, the output voltage across C15 and C16 is 4 Vs. The next negative cycle replenishes the charge on C14 and C15 and the next positive cycle replenishes the charge on C13 and C16. In actuality it takes about 1000 cycles at 100 K Hz (10 msec) to charge the series capacitors, C15 and C16, up to 1000 Vdc. This is because of the loading presented to the transformer's secondary which is not a low impedance output. Each cycle charges the capacitors higher and higher, until the maximum peak 4 Vs is reached. For the indicated component values, voltage ramping is 150 V/msec to 200 V/msec at 230 V.

The nominal transformer voltage output Vs is 250 Vdc. The voltage rating of C13 and C14 must be greater than Vs or 250 Vdc while C15 and C16 must be greater than 2 Vs or 500 Vdc. The diodes are fast recovery IN4947s with Vrb=800 Vdc, greater than the required voltage rating of 2Vs=500 Vdc.

The output source impedance of the high voltage generator 78 is determined by resistor R7, which is 10 K ohm. The protector under test is presented with this high impedance output via diode CR10 through one side of the "side" selector switch 34. The high voltage ramp developed across C15 and C16 is always being presented to the protector through switch contact member 44. When the voltage rises to the arrester breakdown voltage, the arrester suddenly "breaks down" and shorts the high voltage generator's output to the ground pin 10 connected to socket terminal 33.

Ground Fault Detector 88 (FIG. 2B)

As an arrester breakdown detector

When the protector's arrester "breaks down" and shorts out to ground (a "ground fault"), the current which passes to the ground pin creates a voltage rise across resistor R17 (3.6 K ohm) as it continues down to V-. The resistor R16 (100 ohm) in conjunction with the Zener diode VR2 (6.2 V) limits that voltage rise in order to protect MOSFET Q11. A voltage rise across R17 producing a current of at least 1 mamp pulses "ON" Q11 which momentarily discharges capacitor C22 (0.1 uf). Since the gate of the P-channel MOSFET Q10 is also pulled low, Q10 is biased "ON". The transistor Q10 sources current into the gate of SCR1 through a current limiting resistive divider R23a (10 K ohm) and R23b (10 K ohm). The SCR1 is a 600 V rated device connected, via R30 (10 K ohm), to the junction of the high voltage capacitors C15 and C16. This junction is at Vmax/2 before the arrester breakdown occurs.

When the SCR fires, it reduces the high voltage output by ½ by discharging C16. This circuit prevents any more arrester "breakdowns" from occurring, thereby allowing only one "breakdown" voltage to be measured and minimizing the exposure of the protector's arrester. The SCR1 is biased "ON" by the time required to charge-up capacitor C22. This time is determined approximately by the RC time constant: t=R32*C22 (1 Mohm* 0.1 uf), which is 100 msec, longer than the high voltage is present.

As a shunt to ground detector

The transistor Q10 also sources current to a light-emitting diode (LED) 98 of the display 86. The LED's current is limited by resistor R34 (10 K ohm) to approximately 0.7 milliamps. This acceptable low current is possible because the LED is a newly developed high efficiency product from Hewlett Packard. This LED will light any time a ground fault causes the voltage across resistor R17 to be greater than approximately 2.5 V. It will light because of an arrester "breakdown" as shown above, or if a current shunt has been activated, or if an arrester is shorted out.

When the momentary push-button switch 54 is pressed, contact member 56 connects V+ through resistor R37 (1 K ohm) to isolating diodes 48, 50 (CR5, CR6) on both sides of the protector. If there is a path to ground less than 8 K ohms from either side of the protector, the LED 98 will light while the push-button switch 54 is pressed. The diode CR10 prevents any current from flowing into the input of the high voltage divider circuit, R8 and R9, thereby preventing a meaningless rise in displayed voltage.

Continuity Detector 80 (FIG. 2B)

Continuity is defined as a low resistance connection between the protector's "CO" and "FIELD" pins on each side (i.e., between tip side pins 2, 6 and between ring side pins 4, 8). A protector is "bad" if this continuity is not present. If no continuity is detected, the apparatus will not test the arrester voltage.

When the momentary push-button switch 54 is pressed, the DISCHARGE output from the PAL 76 goes active (LOW) and V+ is applied through R37 (1 K ohm) to the isolating diodes 48, 50 on both sides of the protector. The active /DISCHARGE output causes the output of transistor Q1 to go high which generates a positive pulse through capacitor C25 (1.0 uf) at the gate of transistor Q6. Transistor Q6 then pulses ON and discharges the hold capacitor C17 to reset the detector 80.

If the protector has "continuity", whereby current resulting from the connection of V+ through contact member 56 of switch 54 flows through the heat coil 16, 20 which is connected to resistor R35 through contact member 46 of switch 34, the resistor R35 (10 K ohm) will be pulled up close to V+. This voltage is monitored through protection resistor R18 (1 K ohm) connected to one half of the op-amp U4. This LT1013 op-amp is configured as a positive peak detector, tracking the voltage and holding the voltage on C17 (4.7 uf). The capacitor C17 is then buffered by one half of the op-amp U5, which drives the CONTIN line through the current limiting resistor R36 (1 K ohm). The CONTIN line going high causes the "CONTINUITY" indicator to come ON in the LCD 94. It also enables the 100 K Hz drive from the PAL 76 for the high voltage generator.

It should be noted that the side being tested for "continuity" is not the side that will be tested for arrester "breakdown" voltage. This protects the low voltage circuits from the high voltage present during the arrester testing. For the mode of operation of the switch 34 shown in FIG. 2B, the contact member 44 connects the high voltage generator 78 to the tip side voltage arrester 12 and the contact member 46 connects the continuity detector 80 to the ring side heat coil 20. When the rocker switch 34 is moved to its other mode of operation, the contact member 44 connects the high voltage generator 78 to the ring side voltage arrester 14 and the contact member 46 connects the continuity detector 80 to the tip side heat coil 16.

Breakdown Voltage Peak Detector 82 (FIG. 2B)

As the high voltage generator's output voltage ramps up, it is being divided and held by the peak detector circuit 82. This circuit includes an approximately 1/1000 voltage divider (R8=10.0 M ohm 1%, R9=10.0 K ohm 1%) and a low pass filter (C10=2200 pf). The resultant signal is then connected to the input of peak detector op-amp 100 (½ of U4).

When the momentary push-button switch 54 is pressed, the DISCHARGE output from the PAL 76 goes active (LOW). This causes the output of Q1 to go high, which turns "ON" Q3 transistor of the peak detector 82. This discharges hold capacitor C8 (4.7 uf).

When the push-button switch 54 is released, and if "continuity" was detected, the high voltage generator's output begins to ramp up. During this ramp up, the peak detector 82 is tracking the ramp by charging C8 to approximately 1/1000 of the ramp voltage. If an arrester fires or not, the highest voltage C8 is charged up to is held and measured by the analog-to-digital converter of U1.

A/D Converter and Display Driver 84 (FIG. 2A)

U1 is an ICL7129A A/D converter manufactured by MAXIM and INTERSIL. The ICL7129A is a high precision monolithic 4½ digit A/D converter that directly drives the multiplexed liquid crystal display 94. Using its "successive integration" technique, the ICL7129 has ±20,000 count resolution on both 2.0000 V and 200.00 mV ranges. In the illustrated implementation of the present invention, only the 2.0 V range is used and the input signal is always positive. The high impedance differential input is connected across the breakdown voltage hold capacitor C8 via a 1st order low pass filter made up of resistor R6 (100 K ohm) and capacitor C7 (0.1 uf).

U1 requires an external reference of 1.00 V for a 2.00 V range. This reference circuit includes a 1.2 V precision Zener diode VRI (LT1004-1.2), current source and limit resistor R5 (10 K ohm), filter capacitor C6 (0.1 uf), and adjustment potentiometer R4 (20 K ohm). The potentiometer's wiper is connected to the reference input of U1. The potentiometer R4 is adjusted to 1.000 V measuring from the COMMON line (U1-28) to REF HI input (U1-34). This potentiometer R4 is adjusted a second time during fine tuning adjustment during calibration.

Particularly important components are in the measurement section of U1: integrating resistor R3, integrating capacitor C5, and reference capacitor C4. The following equations define these components:

$$R3 = \frac{\text{full scale voltage}}{\text{Iint}} = \frac{2V}{13 \text{ uA}} = 150K \text{ ohm, } 1\%, \text{ metal film}$$

$$C5 = \frac{\text{Iint} \times \text{Tint}}{\text{voltage swing}} = \frac{13.3 \text{ uA} \times 20 \text{ ms}}{2V} = 0.13 \text{ uf, (use 0.1 uf)}$$

Note: C5 needs to be a very stable capacitor (e.g., polypropylene); the actual value is not as critical, since a 2000 V signal (2.0 V at the A/D) is not generated.

where: Iint = integrate current
Tint = integrate time constant
C4 = 1.0 uf (must be a low leakage capacitor, such as polyester)

Since the voltage being converted (0 to 2.0 V) is actually 1/1000 of the actual voltage seen at the protector, the decimal point in the LCD 94 is moved to the right to compensate for the divider. This is done by tying the decimal point (DP) control lines as follows:

DP1 (U1-39) is tied high
DP2 (U1-38) is left floating
DP3 (U1-21) is tied low
DP4 (U1-20) is tied low Display 86 (FIG. 2A)

The display 86 includes the alphanumeric LCD 94 of the LED 98 previously described. The LCD 94 includes numeral displays 102, "LOW BATTERY" indicator 104 and "CONTINUITY" indicator 106.

Figure 3:
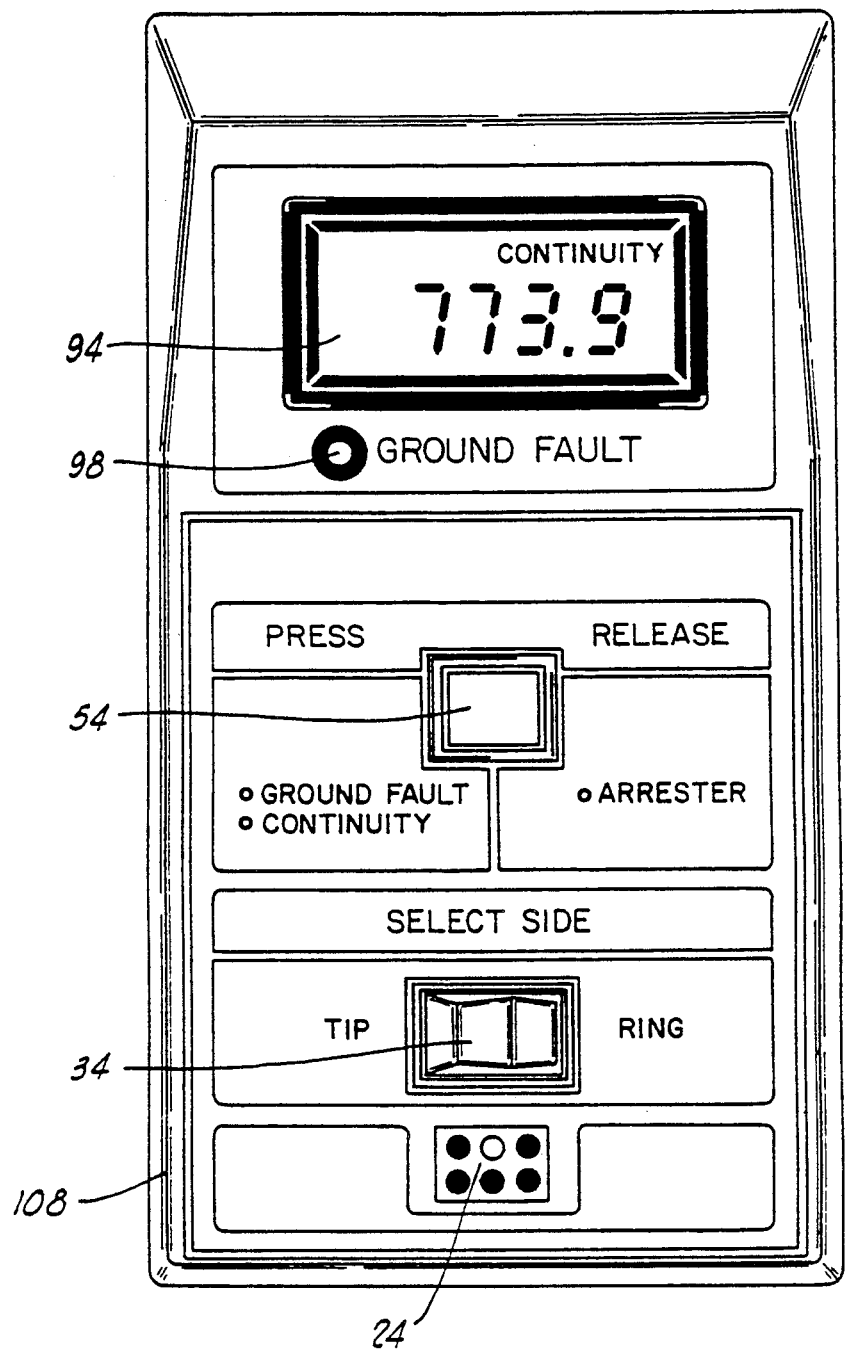
FIG. 3 is an illustration of the face of a preferred embodiment housing of the present invention.

Referring next to FIG. 3, the preferred embodiment of a housing 108 in which the circuits of FIGS. 2A–2B are housed is shown. Accessible through the front panel of, and mounted on, the housing 108 are the socket 24, the tip/ring side selector switch 34, the test operation switch 54, the LCD 94 and the LED 98.

Operation

A protector to be tested is inserted into the socket 24, and the switch 34 is operated to select either the tip side or the ring side. Selecting the tip side places the arrester 12 and the heat coil 20/mechanical shunt 22 under test, and selecting the ring side places the arrester 14 and the heat coil 16/mechanical shunt 18 under test. With the side selected, the protector is ready to be tested.

To test the selected protector components, the single test operating switch 54 is operated through a single switch closure and switch opening cycle. Switch closure occurs in response to manually depressing the push button switch 54, and the switch opening phase occurs automatically upon releasing the manual force applied to the switch 54. Depressing and releasing the switch 54 tests for continuity, ground faults and breakdown voltage and causes results to be indicated via the LCD 94 and the LED 98.

Upon closure of the switch 54, a current is conducted through the protector to test the selected heat coil/shunt in a manner as has been previously described. If the current is conducted through the selected heat coil, this is detected by the continuity detector 80. If the current is conducted through the selected voltage arrester or shunt, this is detected by the ground fault detector 88. In response to detecting the current being conducted through the selected heat coil, the continuity indicator 106 is illuminated and the testing of the selected voltage arrester is enabled by enabling U1 and U3 with the output of the continuity detector 80; if no continuity is detected, the continuity indicator 106 is not illuminated (thereby indicating an open circuit between the field side and central office side of the protectors) and no enabling signal is sent to U1 or U3 so that no further testing occurs. In response to detecting the current being conducted through the ground terminal of the protector, the ground fault indicator LED 98 is illuminated and the testing of the selected voltage arrester is disabled by turning "ON" SCR1 of the ground fault detector 88. If no continuity is detected or a ground fault is detected, the protector is defective.

If continuity and no ground fault are detected, a high voltage is generated and applied to the selected voltage arrester, and the magnitude of the voltage at which the selected voltage arrester breaks down is detected and displayed via the numeral displays 102 of LCD 94.

Operating the single operating switch 54 energizes the electrical circuits within the housing 108 to which the protector is connected. This energization is automatically removed, whereby the electrical circuits are deenergized, after a predetermined time during the single switch operating cycle after the testing and indicating are performed. That is, the apparatus automatically turns itself off in the manner as has been previously described.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. A telephone circuit protector test apparatus, which protector includes a voltage limiting circuit and a current limiting circuit, said test apparatus comprising:
   means for providing a changing voltage to the voltage limiting circuit;
   means for detecting a maximum magnitude of the voltage provided prior to the voltage limiting circuit operating to limit voltage;
   means for providing a current to the current limiting circuit;
   means for detecting current conducted through the current limiting circuit to a telephone circuit terminal of the protector; and
   display means for visually displaying a value of the detected magnitude of the voltage and for visually indicating a response to said means for detecting current.

2. An apparatus as defined in claim 1, further comprising grounding detector means for detecting a short-circuit through the voltage limiting circuit to a ground terminal of the protector and for detecting current conducted through the current limiting circuit to the ground terminal of the protector, said grounding detector means including: means for preventing said means for providing a changing voltage from providing the voltage to the voltage limiting circuit in response to a short-circuit through the voltage limiting circuit or in response to a current conducted through the current limiting circuit to the ground terminal; and means for activating said display means in response to a short-circuit through the voltage limiting circuit or in response to current conducted through the current limiting circuit to the ground terminal.

3. An apparatus as defined in claim 1, further comprising:
   clock means for providing clocking signals;
   counter means, responsive to said clock means, for providing counts of said clocking signals; and
   means, responsive to said counter means, for providing programmed outputs in response to said counts: a first one of said outputs resetting both said means for detecting; a second one of said outputs activating said means for providing a changing voltage; a third one of said outputs causing said detected voltage magnitude value to be retained; and a fourth one of said outputs for deactivating said apparatus.

4. An apparatus as defined in claim 3, wherein said means for providing programmed outputs is responsive to said means for current so that said means for providing programmed outputs is enabled to provide said second one of said outputs in response to detecting current conducted through the current limiting circuit to the telephone circuit terminal of the protector.

5. An apparatus as defined in claim 1, wherein:
   said apparatus further comprises:
   means for connecting to a battery; and
   means for detecting the voltage of a battery connected to said means for connecting; and
   said display means includes low battery indicator means, responsive to said battery voltage detecting means, for visually indicating a low battery voltage condition.

6. An apparatus as defined in claim 1, wherein:
   said means for providing a current includes a switch;
   said apparatus further comprises control means, responsive to said means for detecting current, for resetting both said means for detecting, for activating said means for providing a changing voltage, and for activating said display means; and
   said switch includes means, responsive to a single manual actuation of said switch, for activating said control means and said means for providing a current so that said apparatus tests both the voltage limiting circuit and the current limiting circuit in response to said single manual actuation of said switch.

7. A telephone circuit protector test apparatus, which protector includes: two tip line terminals; two ring line terminals; a ground terminal; a first voltage arrester, connected to one of the tip line terminals and the ground terminal; a e arrester, connected to one of the ring line terminals and the ground terminal; a first heat coil, connected to the tip line terminals; a second heat coil, connected to the ring line terminals; a first current shunt, connected to one of the tip line terminals and the ground terminal; and a second current shunt, connected to one of the ring line terminals and the ground terminal; said apparatus comprising:
   a housing;
   a first switch mounted on said housing;
   a second switch mounted on said housing;
   an alphanumeric display mounted on said housing;
   a light-emitting diode mounted on said housing;
   connector means, mounted on said housing and connected to said first and second switches, for connecting said apparatus with the terminals of the protector;

a first integrated circuit disposed in said housing and connected to said display, said first integrated circuit including an analog-to-digital converter and display drivers;

an oscillator disposed in said housing and connected to said first integrated circuit;

a second integrated circuit, disposed in said housing and connected to said first integrated circuit, said second integrated circuit including a counter;

a third integrated circuit, disposed in said housing and connected to said second integrated circuit, said third integrated circuit including a programmable array logic means for providing four control signals in response to counts from said counter;

a high voltage generator circuit disposed in said housing and connected to said second switch and to said third integrated circuit so that said high voltage generator circuit is responsive to one of said control signals;

a breakdown voltage peak detector circuit disposed in said housing and connected to said high voltage generator circuit, to said first integrated circuit, and to said third integrated circuit so that said breakdown voltage peak detector is responsive to another of said control signals;

a continuity detector circuit disposed in said housing and connected to said second switch and to said first and third integrated circuits, wherein said continuity detector circuit is responsive to said another of said control signals;

a ground fault detector circuit disposed in said housing and connected to said connector means, to said high voltage generator circuit, and to said light-emitting diode so that said light-emitting diode is responsive to said ground fault detector circuit; and an on/off control circuit disposed in said housing and connected to said first switch, to said second integrated circuit, and to said third integrated circuit so that said on/off control circuit automatically turns said apparatus off in response to a further one of said control signals.

8. An apparatus as defined in claim 7, wherein said first rated circuit is connected to said third integrated circuit so that said first integrated circuit is responsive to the one of said four control signals.

9. An apparatus as defined in claim 7, wherein said second switch and said connector means are connected so that in one mode of operation said second switch connects said high voltage generator circuit to the first voltage arrester of a protector connected to said connector means, and connects said continuity detector circuit to the second heat coil of a connected protector; and further so that in another mode of operation said second switch connects said high voltage generator circuit to the second voltage arrester of a connected protector, and connects said continuity detector circuit to the first heat coil of a connected protector.

10. An apparatus as defined in claim 9, wherein said first integrated circuit is connected to said third integrated circuit so that said first integrated circuit is responsive to the remaining one of said four control signals.

11. A method of testing a telephone circuit protector which includes: two tip line terminals; two ring line terminals; a round terminal; a first voltage arrester, connected to one of the tip line terminals and the ground terminal; a second voltage arrester, connected to one of the ring line terminals and the round terminal; a first heat coil, connected to the tip line terminals; a second heat coil, connected to the ring line terminals; a first current shunt, connected to one of the tip line terminals and the ground terminal; and a second current shunt, connected to one of the ring line terminals and the ground terminal; said method comprising:

selecting either the first voltage arrester and the second heat coil and current shunt or the second voltage arrester and the first heat coil and current shunt for testing; and operating a single switch through a single switch closure and switch opening cycle for testing the selected voltage arrester and heat coil for breakdown voltage and Continuity, respectively, and indicating a result of the testing, including:

upon the single closure of said single switch, conducting a current through the protector and detecting whether the current is conducted through the selected heat coil to its respective line terminal or through the selected voltage arrester or current shunt to the ground terminal;

illuminating a continuity indicator and enabling the testing of the selected voltage arrester in response to detecting the current being conducted through the selected heat coil;

illuminating a ground fault indicator and disabling the testing of the selected voltage arrester in response to detecting the current being conducted through the ground terminal;

generating and applying a high voltage to the selected voltage arrester in response to detecting the current being conducted through the selected heat coil; and detecting and displaying the magnitude of the maximum voltage before the selected voltage arrester breaks down in response to the generated and applied high voltage.

12. A method as defined in claim 11, wherein said operating a single switch energizes an electrical circuit to which the protector is ConneCted and wherein said operating a single switch further includes automatically denergizing the electrical circuit during said single switch operating cycle after said testing performed.

* * * * *

UNITED STATES PATENT AND TRADEMARK OFFICE
CERTIFICATE OF CORRECTION

PATENT NO. : 4,991,195
DATED : February 5, 1991
INVENTOR(S) : Lawrence O. Hilligoss and Myron C. Butler It is certified that error appears in the above-identified patent and that said Letters Patent is hereby corrected as shown below:

Column 4, line 28, change "inCludes" to --includes--.
Column 7, line 9, change "ICL7129 A" to --ICL7129A--.
Column 7, line 63, change "phase 1" to --phase_1--.
Column 8, line 14, change "count0" to --count = 0--.
Column 11, line 28, change "DISCHARGE" to --/DISCHARGE--.

Column 14, line 52, delete "e" and insert --second voltage arrester--.
Claim 11, column 16, line 10, change "round" to --ground--.
Claim 11, column 16, line 13, change "round" to --ground--.
Claim 11, column 16, line 27, change "Continuity" to --continuity--.
Claim 12, column 16, line 53, change "ConneCted" to --connected--.
Claim 12, column 16, line 56, after "testing", insert --and indicating are--.

Signed and Sealed this

Twenty-fifth Day of August, 1992

Attest:

DOUGLAS B. COMER

*Attesting Officer*     *Acting Commissioner of Patents and Trademarks*